(12) United States Patent
Han

(10) Patent No.: US 8,687,090 B2
(45) Date of Patent: Apr. 1, 2014

(54) METHOD OF REMOVING AUDIO NOISE AND IMAGE CAPTURING APPARATUS INCLUDING THE SAME

(75) Inventor: Seung-won Han, Jeonju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/242,470

(22) Filed: Sep. 23, 2011

(65) Prior Publication Data

US 2012/0127341 A1 May 24, 2012

(30) Foreign Application Priority Data

Nov. 24, 2010 (KR) ........................ 10-2010-0117650

(51) Int. Cl.
*H04N 5/76* (2006.01)
(52) U.S. Cl.
USPC ...................................................... 348/231.4
(58) Field of Classification Search
USPC ...................................................... 348/231.4
See application file for complete search history.

(56) References Cited

U.S. PATENT DOCUMENTS

| 7,684,982 B2 * | 3/2010 | Taneda ........................ 704/233 |
| 2005/0212930 A1 * | 9/2005 | Sim et al. .................... 348/231.4 |
| 2011/0234848 A1 * | 9/2011 | Matsumoto et al. ....... 348/231.4 |
| 2012/0050570 A1 * | 3/2012 | Jasinski et al. ............. 348/231.4 |

FOREIGN PATENT DOCUMENTS

| JP | 2008-252389 | 10/2008 |
| JP | 2010-028281 | 2/2010 |

* cited by examiner

*Primary Examiner* — Twyler Haskins
*Assistant Examiner* — Padma Haliyur
(74) *Attorney, Agent, or Firm* — Stanzione & Kim, LLP

(57) ABSTRACT

A method of removing an audio noise and an image capturing apparatus providing the same includes storing a specified audio signal included in a captured image as a noise signal, receiving an input audio signal included in an image, and removing a noise included in a transformed audio signal through a comparison between the input audio signal and the noise signal. Accordingly, the audio noise included in the input audio signal is removed, and thus the sound that is not desired by a user can be easily removed.

20 Claims, 6 Drawing Sheets

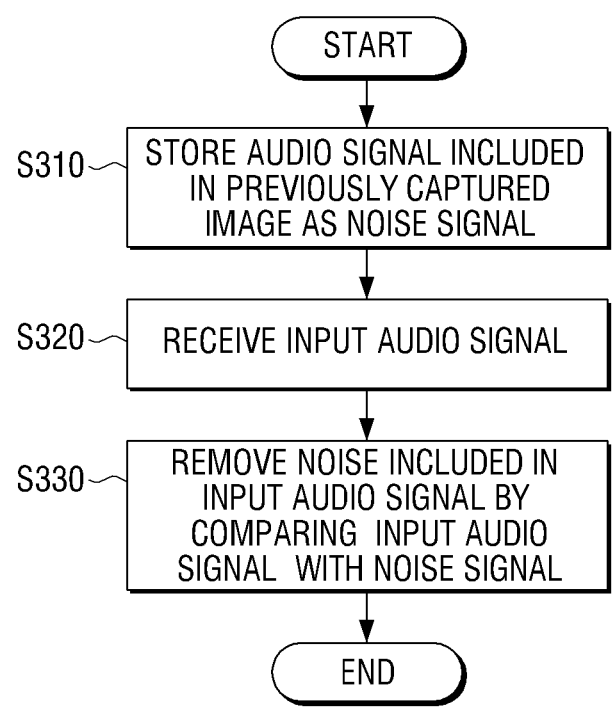

METHOD OF REMOVING AUDIO NOISE AND IMAGE CAPTURING APPARATUS INCLUDING THE SAME

CROSS-REFERENCE TO RELATED APPLICATIONS

This application claims priority under 35 U.S.C. §119(a) from Korean Patent Application No. 10-2010-0117650, filed on Nov. 24, 2010, in the Korean Intellectual Property Office, the disclosure of which is incorporated herein by reference.

BACKGROUND OF THE INVENTION

1. Field of the Invention

The present general inventive concept relates to a method of removing an audio noise and an image capturing apparatus adopting the same, and more particularly to a method of removing an audio noise and an image capturing apparatus including the same, which may remove an audio noise included in a captured image.

2. Description of the Related Art

In general, an image capturing apparatus such as a camcorder may record an audio as well as capture an image. A recorded audio is stored together with the captured image. In the case where a user desires reproduction of the image later, not only the captured image but also the recorded audio is reproduced.

However, while the image is captured, the audio that is desired by a user may not be properly recorded due to surrounding environments. For example, in the case of capturing an image in a rainy day, the sound of raining is recorded together with the audio which the user desires to record. Accordingly, the user may not properly record the desired audio due to the sound of raining. Here, the audio, such as the sound of raining, sound of the surrounding area, or the like, which is not desired by the user to be recorded together with the desired audio is called an audio noise. If there is a large audio noise in the environment where an image is captured, the user may not properly record the audio which the user desires to record.

Accordingly, there is a need for schemes to remove the audio noise so that the user can record a desired audio only even in the environment where a large audio noise exists.

SUMMARY OF THE INVENTION

The present general inventive concept has been made to address at least the above problems and/or disadvantages and to provide at least the advantages described below. Accordingly, a feature of the present general inventive concept provides a method of removing an audio noise and an image capturing apparatus including the same, which can remove an audio noise included in an input audio signal based on a comparison between the input audio signal and a noise signal that is stored as a noise signal of an audio signal included in a captured image.

Additional features and utilities of the present general inventive concept will be set forth in part in the description which follows and, in part, will be obvious from the description, or may be learned by practice of the general inventive concept.

An exemplary embodiment of the present general inventive concept provides a method of removing an audio noise, which includes storing a specified audio signal included in a captured image as a noise signal, receiving an input audio signal included in an image, and removing a noise included in a transformed audio signal through comparison of the input audio signal with the noise signal.

The storing operation may include transforming the specified audio signal into a frequency domain using FFT (Fast Fourier Transform) and storing the frequency domain as the noise signal, and storing a gain function that is calculated through a spectrum prediction method with respect to the noise signal.

The removing operation may include transforming the input audio signal into the frequency domain using the FFT, and removing a frequency band portion which corresponds to the noise signal from a frequency band included in the audio signal through comparison of the noise signal transformed into the frequency domain with the audio signal transformed into the frequency domain.

The frequency band removing operation may remove the noise by multiplying the frequency band portion, which corresponds to the noise signal, of the frequency band included in the audio signal by the gain function.

The removing operation may further include transforming the audio signal of the frequency domain, from which the noise has been removed, into a time domain using an inverse FFT.

The removing operation may be performed when a noise removing mode is set by a user's specified input.

The noise removing mode may include a plurality of noise removing modes that correspond to a plurality of noises, respectively.

The plurality of noises may include at least one of the sound of raining, sound of wind, sound of waves, chirring of a cicada, and indoor howling sound, and the plurality of noise removing modes may include at least one of a raining sound removing mode, a wind sound removing mode, a wave sound removing mode, a cicada chirring removing mode, and an indoor howling sound removing mode.

Another exemplary embodiment of the present general inventive concept provides an image capturing apparatus which includes an audio input unit receiving an input audio signal, a storage unit storing a specified audio signal included in a captured image as a noise signal, an audio processing unit removing a noise included in a transformed audio signal through comparison of the input audio signal with the noise signal, and an audio output unit outputting the audio signal from which the noise has been removed.

The storage unit may store the noise signal that is the specified audio signal transformed into the frequency domain using FFT (Fast Fourier Transform) and a gain function that is calculated through a spectrum prediction method with respect to the noise signal.

The audio processing unit may include a noise removing unit which transforms the input audio signal into the frequency domain using the FFT, and removes a frequency band portion which corresponds to the noise signal from a frequency band included in the audio signal through comparison of the noise signal stored in the storage unit with the audio signal transformed into the frequency domain.

The noise removing unit may remove the noise by multiplying the frequency band portion, which corresponds to the noise signal, of the frequency band included in the audio signal by the gain function.

The audio processing unit may transform the audio signal of the frequency domain, from which the noise has been removed, into a time domain using an inverse FFT.

The image capturing apparatus according to another exemplary embodiment of the present general inventive concept may further include a user command input unit receiving a user's specified input, wherein the audio processing unit removes the noise when a noise removing mode is set by the user's specified input.

The noise removing mode may include a plurality of noise removing modes that correspond to a plurality of noises, respectively.

The plurality of noises may include at least one of the sound of raining, sound of wind, sound of waves, chirring of a cicada, and indoor howling sound, and the plurality of noise removing modes may include at least one of a raining sound removing mode, a wind sound removing mode, a wave sound removing mode, a cicada chirring removing mode, and an indoor howling sound removing mode.

In another feature of the present general inventive concept, an audio module of an image capturing apparatus includes an audio receiving unit to receive an input audio signal, and a noise removing unit in electrical communication with the audio receiving unit to transform the input audio signal existing in a time domain into a transformed input audio signal having an input frequency band, and to compare the input frequency band with a predetermined noise frequency band.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which:

FIG. 3 is a flowchart illustrating a method of removing an audio noise of an image capturing apparatus according to an exemplary embodiment of the present general inventive concept.

DETAILED DESCRIPTION OF THE EMBODIMENTS

Figure 1:
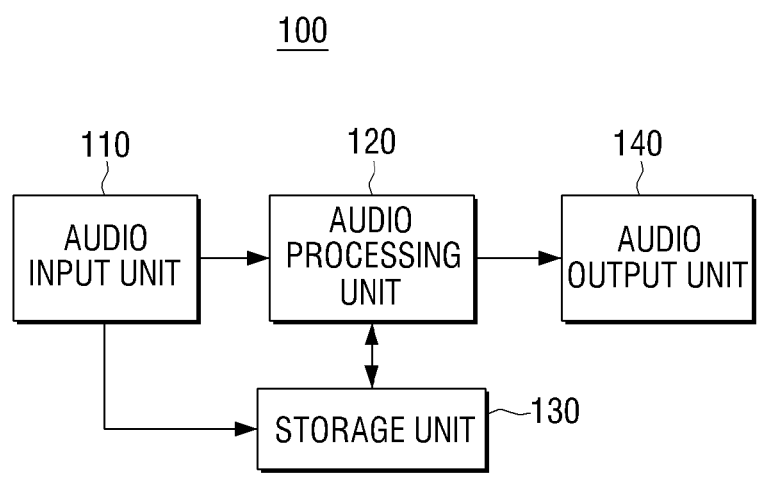
FIG. 1 is a block diagram simply illustrating the configuration of an image capturing apparatus according to an exemplary embodiment of the present general inventive concept.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

FIG. 1 is a block diagram illustrating a general configuration of an image capturing apparatus 100 according to an exemplary embodiment of the present general inventive concept. As illustrated in FIG. 1, the image capturing apparatus 100 according to an exemplary embodiment of the present general inventive concept includes an audio input unit 110, an audio processing unit 120, a storage unit 130, and an audio output unit 140. The image capturing apparatus 100 may include, but is not limited to, a camcorder, a camera, a personal media player (PMP), a cellular phone, or the like, which can capture both an image and an audio.

The audio input unit 110 receives an input audio signal through a microphone or the like. Upon receiving the input audio signal, the audio input unit 110 may transmit the input audio signal to the audio processing unit 120.

The audio processing unit 120 performs a signal process including, but not limited to, an audio encoding of the input audio. More specifically, the audio processing unit 120 may convert the input analog audio signal into a digital signal audio signal. Also, the audio processing unit 120 transforms the input audio signal from a time domain to a frequency domain using FFT (Fast Fourier Transform) to generate a transformed audio signal.

Also, the audio processing unit 120 may remove a frequency band portion from the input audio signal that coincides with a pre-stored noise signal, which may be previously stored in the storage unit 130. More specifically, the audio processing unit 120 may remove the frequency band from the input audio signal that coincides with the pre-stored noise signal based on a comparison between the transformed audio signal transformed into the frequency domain with the pre-stored noise signal. In at least one exemplary embodiment of the present general inventive concept, the pre-stored noise signal may be a signal that is designated by a user as a noise signal in the input audio signal of the previously captured image, which may also be stored in the storage unit 130.

The method of removing a noise signal will be described in more detail. As mentioned above, the storage unit 130 may store a pre-stored noise signal. The storage unit 130 may also store a gain function. The gain function may be calculated through a spectrum prediction method with respect to the noise signal. Also, the storage unit 130 may store a designated noise audio signal which has been designated by the user as noise to be removed from the input audio signal included in the previously captured image. The stored noise signal may also be transformed from the time domain to the frequency domain using the FFT to generate a transformed noise signal, which is stored in the storage unit 130. In addition, the storage unit 130 may also store programs to perform various kinds of functions of the image capturing apparatus 100 and image data captured by the user, as discussed in greater detail below.

Accordingly, the audio processing unit 120 may remove the noise signal using a multiplication operation based on a frequency band portion of the input audio signal, the pre-stored noise signal, and the gain function. More specifically, the noise signal may be removed by reducing the amplitude of the frequency band portion of the input audio signal, which coincides with the pre-stored noise signal, to a specified ratio through multiplication of the frequency band portion, which coincides with the pre-stored noise signal, of the frequency band of the input audio signal, by the gain function.

Also, the audio processing unit 120 may transform the transformed audio signal from which the noise has been removed, from the frequency domain to a time domain using an inverse FFT to generate the output audio signal.

Also, the audio processing unit 120 outputs the output audio signal from which the noise has been removed to the storage unit 130 and/or the audio output unit 140.

The audio output unit 140 outputs the audio signal processed by the audio processing unit 120. In this case, the output audio signal may be a processed input audio signal from which the noise has been removed.

As described above, by removing the audio noise included in the input audio signal, the image capturing apparatus 100 easily removes sound that is not desired by the user.

Figure 2:
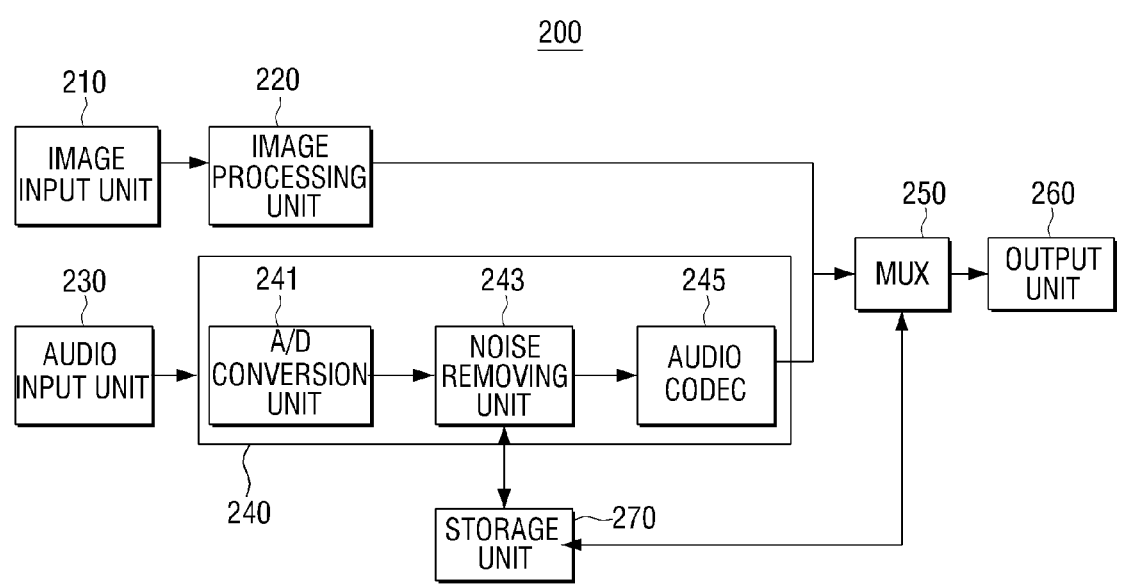
FIG. 2 is a block diagram illustrating in detail an image capturing apparatus according to an exemplary embodiment of the present general inventive concept.

Referring now to FIG. 2, the image capturing apparatus 200 according to an exemplary embodiment of the present general inventive concept will be described in more detail. FIG. 2 is a block diagram illustrating in detail an image capturing apparatus according to an exemplary embodiment of the present general inventive concept.

The image capturing apparatus 200 includes an image input unit 210, an image processing unit 220, an audio input unit 230, an audio processing unit 240, a multiplexer (MUX) 250, an output unit 260, and a storage unit 270.

The image input unit 210 receives light through a lens, and converts the light input through an image sensor unit (not illustrated) into image data that is an electric signal. In this case, the image sensor unit (not illustrated) may be implemented by a CCD (Charge-Coupled Device) image sensor or a CMOS (Complementary Metal-Oxide Semiconductor) image sensor.

The image processing unit 220 performs image processing by performing scaling, encoding, and the like, of the input image data. In this case, the image processing unit 220 includes a scaler (not illustrated) adjusting the size of the image data, and an image codec (not illustrated) performing encoding and decoding of the image data.

The audio input unit 230 receives an input audio signal through an audio input device, such as a microphone, or the like. In this case, the audio input unit 230 transmits the input audio signal to the audio processing unit 240.

The audio processing unit 240 performs audio processing including, but not limited to, conversion of the input audio signal into audio data that is a digital signal, removing of the noise signal from the input audio data, and encoding of the audio signal from which the noise has been removed. The audio processing unit 240, as illustrated in FIG. 2, may include an A/D conversion unit 241, a noise removing unit 243, and an audio codec 245.

The A/D conversion unit 241 converts the input analog audio signal into an input digital audio data signal, i.e., the input audio data.

The noise removing unit 243 transforms the input audio data from a time domain to a frequency domain, and compares the frequency band of the input audio data with the frequency band of a noise signal stored in the storage unit 270. As discussed above, the storage unit 270 may store one or more pre-stored noise signals and/or one or more user designated noise signals. Accordingly, the noise removing unit 243 detects whether the frequency band of the input audio data coincides with the center frequency of the frequency band of the stored noise data, i.e., the pre-stored noise signal and/or the user designated noise signal. In this case, the pre-stored noise signals in the storage unit 270 may include the sound of raining, the sound of wind, the sound of waves, the indoor howling sound, and the like. However, such noises are merely exemplary. The user designated noise signals may include a specified sound that the user desires to remove. The user designated noise signals may be directly recorded, and then stored in the storage unit 270.

If there is a frequency band portion of the frequency band of the input audio data that coincides with the frequency band of the pre-stored noise signal, the noise removing unit 243 removes the frequency band portion that coincides with the frequency band of the pre-stored noise signal from the frequency band of the input audio data. More specifically, the noise removing unit 243 reduces the frequency band of the input audio signal coinciding with the pre-stored noise signal to a predetermined ratio. More specifically, the noise reducing unit multiplies the frequency band portion, which coincides with the frequency band of the noise signal, of the frequency band of the input audio signal by the gain function that corresponds to the pre-stored noise signal. For example, if it is assumed that the center frequency of the noise signal is 80 KHz, the noise removing unit 243 may remove audio noise from the input audio signal by reducing the ratio of the amplitude of the 80 KHz frequency band portion of the frequency domain of the input audio signal to the original amplitude to 10%.

Also, the noise removing unit 243 transforms the process input audio signal from which the noise has been removed from the frequency domain to the time domain using the inverse FFT to generate an output audio signal. Then, the noise removing unit 243 may output the output audio signal from which the noise has been removed to the audio codec 245.

The audio codec 245 performs encoding of the audio data from which the noise has been removed.

As another exemplary embodiment of the present general inventive concept, the audio processing unit 240 may perform the above-described audio noise removing operation only in a case where a noise removing mode is set by a user command input through a user command input unit (not illustrated).

In this case, the noise removing mode may be implemented as a mode in which all noises are automatically removed through detection of whether the noise exists in the captured image, or a mode in which only a specified noise is detected and removed. The mode in which only a specified noise is detected and removed is to remove the specified noise, and may be a raining sound removing mode, a wind sound removing mode, a wave sound removing mode, an indoor howling sound removing mode, or the like. However, such a noise removing mode is merely exemplary, and a mode may be set so the user may directly remove a specified sound. The details of the noise removing mode will be described later with reference to FIGS. 4A to 4B.

The MUX unit 250 converts the image data into an image file of a specified format by combining the image data with audio data. Also, the MUX unit 250 transmits the image file of a specified format to the storage unit 270 or the output unit 260. Here, the specified format is a format that is appropriate to store the image file.

The output unit 260 outputs the image file of the specified format combined through the MUX unit 250. In this case, the audio included in the image file being output may be the output audio signal from which the noise has been removed.

The storage unit 270 stores programs to perform various kinds of functions of the image capturing apparatus 200 and image data captured by the user.

As mentioned above, the storage unit 270 may store a user designated noise signal which has been designated by the user as noise in the audio signal of the previously captured image to be removed. In this case, the stored user designated noise signal is also transformed from the time domain to the frequency domain using the FFT. At this time, in addition to storing the user designated noise signal, the storage unit 270 stores the gain function that may be calculated through a spectrum prediction method with respect to the user designated noise signal.

Also, the storage unit 270 may store the image file of the specified format which is obtained by combining the audio data and the image data through the MUX unit 250.

Also, the storage unit 270 may include a noise gain function storage unit (not illustrated) and an image file storage unit (not illustrated). The noise gain function storage unit stores information on the noise gain functions, and the image file storage unit stores image files output from the MUX unit 250. In this case, the noise gain function storage unit is connected to the noise removing unit 243, and the image file storage unit is connected to the MUX unit 250.

In this case, the storage unit 270 may be implemented by a hard disk, a nonvolatile memory, or the like. As described above, by removing the audio noise that is included in the input audio signal, the image capturing apparatus 200 may easily remove the sound that is not desired by the user.

Hereinafter, with reference to FIG. 3, a method of removing an input audio noise of the image capturing apparatus 200 will be described in detail.

FIG. 3 is a flowchart illustrating a method of removing an audio noise of an image capturing apparatus according to an exemplary embodiment of the present general inventive concept.

First, the image capturing apparatus 200 stores a designated noise audio signal included in a specified image previously captured by a user as a pre-stored noise signal (operation 310). More specifically, the image capturing apparatus 200 may receive a designated noise signal input by a user. The designated noise signal corresponds to an undesired noise of the input audio signal included in the specified image previously captured by the user. In order to remove the designated noise signal, the image capturing apparatus 200 may transform the corresponding input audio signal from a time domain to a frequency domain using the FFT to generate a transformed audio signal. Also, the image capturing apparatus 200 may calculate a gain function through a spectrum prediction method with respect to the corresponding input audio signal. The gain function may be stored in the storage unit 270. Also, the image capturing apparatus 200 may store the transformed audio signal transformed into a frequency domain to generate the designated noise signal, which may be stored in the storage unit 270, along with the gain function. In this case, the designated noise signal that is designated by the user includes, but is not limited to the sound of raining, sound of wind, sound of waves, indoor howling sound, or the like. However, this is merely exemplary, and a specified sound that the user desires to remove may be directly recorded and designated as a noise.

Then, the image capturing apparatus 200 receives an input audio signal (operation 320). In this case, the audio signal may be input through a microphone or the like. The input audio signal may include a noise, in which the user prefers to remove.

Accordingly, the image capturing apparatus 200 removes the noise included in the input audio signal by comparing the input audio signal with the stored noise signal, mentioned above (operation 330). Specifically, the image capturing apparatus 200 transforms the input audio data from the time domain to the frequency domain. Then, the image capturing apparatus 200 compares the frequency band of the input audio data with the frequency band of the pre-stored noise signal stored in operation 310. Particularly, the image capturing apparatus 200 detects whether the frequency band of the input audio data coincides with the center frequency of the frequency band of the pre-stored noise data.

If there is a frequency band portion of the frequency band of the input audio data that coincides with the frequency band of the pre-stored noise signal, the image capturing apparatus 200 removes the frequency band portion that coincides with the frequency band of the pre-stored noise signal from the frequency band of the input audio data. More specifically, the image capturing apparatus 200 reduces the frequency band of the pre-stored noise signal to a predetermined ratio by multiplying the frequency band portion, which coincides with the frequency band of the pre-stored noise signal, of the frequency band of the input audio signal by the gain function that corresponds to the pre-stored noise signal.

Also, the image capturing apparatus 200 transforms the audio data from which the noise has been removed from the frequency domain to the time domain using the inverse FFT to generate an output audio signal. Then, the image capturing apparatus 200 may perform encoding of the output audio signal from which the noise has been removed.

Also, the output audio signal from which the noise has been removed may be combined with the image data, and then is stored in the storage unit 270 and/or is output by the output unit 260.

As another exemplary embodiment of the present general inventive concept, the operation 330 may be performed only in the case where the noise removing mode is set by a user's specified command.

Hereinafter, with reference to FIGS. 4A to 4C, an audio noise removing mode will be described in detail.

Figure 4A:
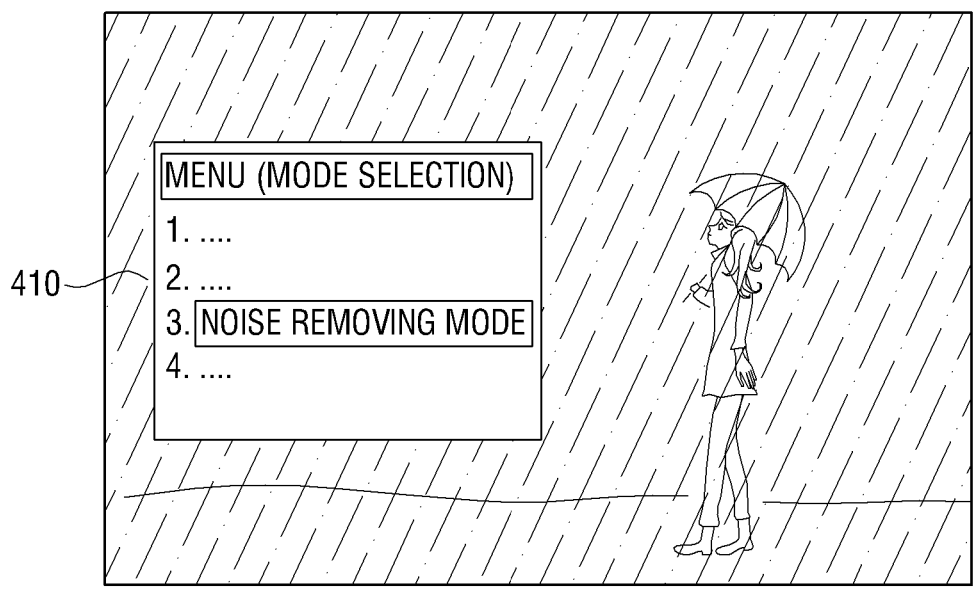
FIGS. 4A to 4C are diagrams illustrating a display screen of an image capturing apparatus in a noise removing mode according to an exemplary embodiment of the present general inventive concept.
Figure 4B:
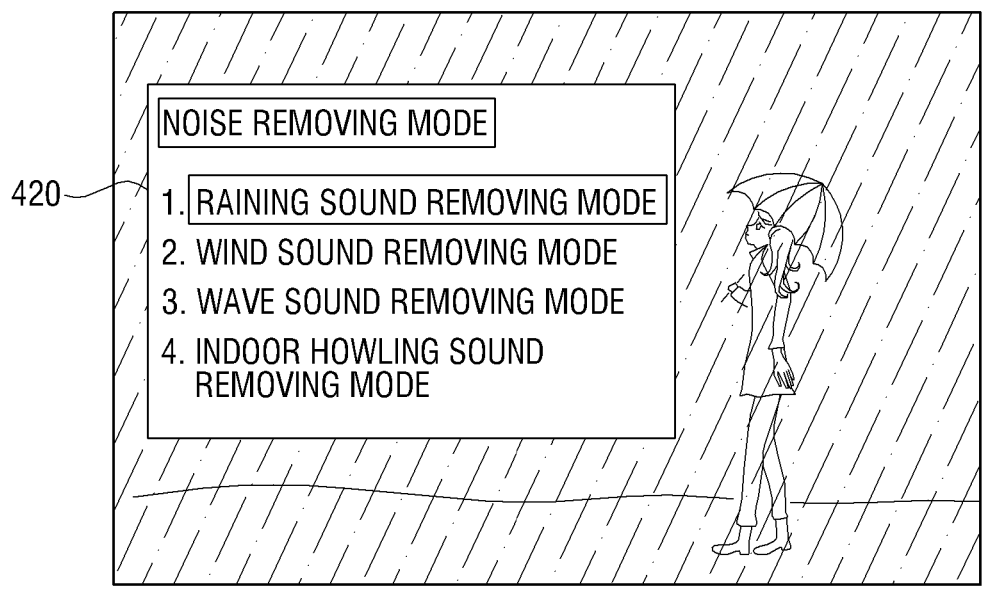
Figure 4C:
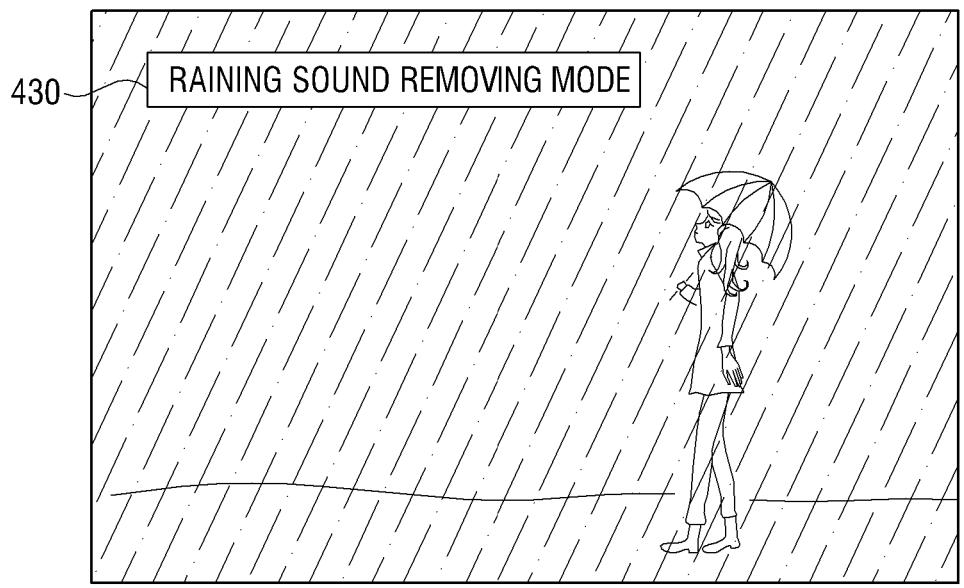

FIGS. 4A to 4C are diagrams illustrating a display screen of an image capturing apparatus in a noise removing mode according to an exemplary embodiment of the present general inventive concept.

As illustrated in FIG. 4A, if a user's specified command indicating a designated noise signal to be removed is input through the GUI, the image capturing apparatus 200 enters into a mode selection menu 410. In this case, the mode selection menu may include diverse modes, and particularly, a noise removing mode. Here, the noise removing mode includes a mode to remove an audio signal that is designated as a noise from the input audio signal included in the captured image.

If the noise removing mode is selected by the user's input, as illustrated in FIG. 4B, the image capturing apparatus 200 displays a GUI 420 to select a plurality of noise removing modes in which diverse noises can be removed. In this case, the plurality of noise removing modes include, but is not limited to, a raining sound removing mode, a wind sound removing mode, a wave sound removing mode, an indoor howling sound removing mode, and the like. However, the plurality of noise removing modes are merely exemplary, and a specified sound that is directly recorded by the user may indicate a designated noise signal. Accordingly, and a noise removing mode to remove the specified designated noise signal may be set.

If the specified noise removing mode is selected by the user's specified selection, the image capturing apparatus 200 enters into the specified noise removing mode, and as described above with reference to FIGS. 1 to 3, removes the designated noise signal. For example, as illustrated in FIG. 4B, if the user selects the raining sound removing mode, the image capturing apparatus 200 enters into the raining sound removing mode, and removes the sound of raining from the input audio signal included in the captured image. Accordingly, when the image capturing apparatus 200 enters into the raining sound removing mode, it displays a GUI 430 that displays the raining sound removing mode.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Accordingly, if the user selects the specified noise removing mode to remove the specified noise, only the noise desired by the user is removed, and thus the noise can be removed more easily and conveniently.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A method of removing an audio noise, comprising:
storing a specified audio signal included in a previously captured image as a noise signal;
receiving an input audio signal included in an image; and
removing a noise included in a transformed audio signal based on a comparison between the input audio signal and the noise signal.

2. The method of removing an audio noise as claimed in claim 1, wherein the storing a specified audio signal comprises:
transforming the specified audio signal into a frequency domain using FFT (Fast Fourier Transform) to generate a transformed noise signal and storing the transformed noise signal existing in the frequency domain as the noise signal; and
storing a gain function that is calculated through a spectrum prediction method based on the transformed noise signal.

3. The method of removing an audio noise as claimed in claim 2, wherein the removing the noise included in a transformed audio signal comprises:
transforming the input audio signal into the frequency domain using the FFT to generate the transformed audio signal; and
removing a frequency band portion corresponding to the noise signal from a frequency band included in the audio signal based on a comparison between the transformed noise signal transformed into the frequency domain and the transformed audio signal transformed into the frequency domain.

4. The method of removing an audio noise as claimed in claim 3, wherein the removing a frequency band portion includes removing the noise in response to multiplying the gain function by the frequency band portion, which corresponds to the noise signal, of the frequency band included in the audio signal.

5. The method of removing an audio noise as claimed in claim 4, wherein the removing a frequency band portion further comprises transforming the transformed audio signal of the frequency domain, from which the noise has been removed, into a time domain using an inverse FFT to generate an output audio signal.

6. The method of removing an audio noise as claimed in claim 1, wherein the removing a noise included in a transformed audio signal is performed when a noise removing mode is set in response to a user's specified input.

7. The method of removing an audio noise as claimed in claim 6, wherein the noise removing mode includes a plurality of noise removing modes based on a plurality of noises, respectively.

8. The method of removing an audio noise as claimed in claim 7, wherein the plurality of noises include at least one of a sound of raining, a sound of wind, a sound of waves, a chirring of a cicada, and an indoor howling sound, and
the plurality of noise removing modes include at least one of a raining sound removing mode, a wind sound removing mode, a wave sound removing mode, a cicada chirring removing mode, and an indoor howling sound removing mode.

9. An image capturing apparatus comprising:
an audio input unit to receive an input audio signal;
a storage unit to store a specified audio signal included in a captured image as a noise signal;
an audio processing unit to remove a noise included in a transformed audio signal based on a comparison between the transformed audio signal and the noise signal; and
an audio output unit to output an output audio signal that excludes the noise.

10. The image capturing apparatus as claimed in claim 9, wherein the noise signal is a transformed noise signal transformed into a frequency domain using FFT (Fast Fourier Transform), and wherein the storage unit stores the transformed noise signal and a gain function that is calculated through a spectrum prediction method with respect to the transformed noise signal.

11. The image capturing apparatus as claimed in claim 10, wherein the audio processing unit comprises a noise removing unit that transforms the input audio signal into the frequency domain using the FFT to generate the transformed audio signal, and removes a frequency band portion that corresponds to the noise signal from a frequency band included in the input audio signal based on a comparison between the noise signal stored in the storage unit and the transformed audio signal transformed into the frequency domain.

12. The image capturing apparatus as claimed in claim 11, wherein the noise removing unit removes the noise by multiplying the frequency band portion, which corresponds to the noise signal, of the frequency band included in the input audio signal, by the gain function.

13. The image capturing apparatus as claimed in claim 12, wherein the audio processing unit transforms the transformed audio signal existing in the frequency domain, from which the noise has been removed, into a time domain using an inverse FFT to generate the output audio signal.

14. The image capturing apparatus as claimed in claim 9, further comprising a user command input unit receiving a user's specified input;
wherein the audio processing unit removes the noise when a noise removing mode is set by the user's specified input.

15. The image capturing apparatus as claimed in claim 14, wherein the noise removing mode includes a plurality of noise removing modes that correspond to a plurality of noises, respectively.

16. The image capturing apparatus as claimed in claim 15, wherein the plurality of noises includes at least one of the sound of raining, sound of wind, sound of waves, chirring of a cicada, and indoor howling sound, and
the plurality of noise removing modes includes at least one of a raining sound removing mode, a wind sound removing mode, a wave sound removing mode, a cicada chirring sound removing mode, and an indoor howling sound removing mode.

17. An audio module of an image capturing apparatus, comprising:

an audio receiving unit to receive an input audio signal; and a noise removing unit in electrical communication with the audio receiving unit to transform the input audio signal existing in a time domain into a transformed input audio signal having an input frequency band, and to compare the input frequency band with a predetermined noise frequency band.

18. The audio module of claim 17, wherein the noise removing unit determines a noise portion of the input frequency band based on the comparison between the input frequency band and the predetermined noise frequency band.

19. The audio module of claim 18, wherein the noise removing unit determines a portion of the input frequency band as the noise portion when a center of the predetermined noise frequency band coincides with the portion of the input frequency band.

20. The audio module of claim 19, wherein the noise reducing unit reduces the noise portion of the input frequency band by a predetermined ratio based on a product of the noise portion of the input frequency band and a gain function corresponding to the predetermined noise frequency band.

* * * * *